Patented Dec. 26, 1922.

1,440,176

UNITED STATES PATENT OFFICE.

ELOI RICARD, OF MELLE, FRANCE, ASSIGNOR TO SOCIÉTÉ RICARD, ALLENET & CIE., OF DISTILLERIES DES DEUX-SÈVRES, À MELLE (DEUX-SÈVRES), FRANCE.

VULCANIZING RUBBER.

No Drawing.   Application filed June 21, 1920.   Serial No. 890,619.

*To all whom it may concern:*

Be it known that I, ELOI RICARD, a citizen of the French Republic, residing at Distilleries des Deux-Sèvres, of Melle, Deux-Sèvres, in the Republic of France, have invented certain new and useful Improvements in Vulcanizing Rubber; and I do hereby declare the following to be a full, clear, and exact description of the invention, such as will enable others skilled in the art to which it appertains to make and use the same.

The rubber industry is based on an operation called vulcanizing which consists in heating the rubber, either pure or mixed with various materials, with sulphur to a certain temperature and under steam pressure in an autoclave or in moulds.

In the course of this operation the properties of the rubber are profoundly modified under the influence of chemical and physical actions of the elements present. The rubber becomes insoluble in solvents and acquires elasticity, strength, nervous quality and even hardness, according to the proportion of sulphur used.

It has been known for some years that the phenomenon of vulcanization is due to the presence of organic matters originally contained in the natural rubber. Starting from this observation, it has been sought to improve the vulcanization by adding to the mixture to be vulcanized various organic matters, and it has been found that certain of these accelerate considerably the vulcanization. Among those already known, the chief are—dimethylaniline, piperidine, anthraquinone, diphenylurea, paranitrosodimethylaniline, paraphenylenediamine, formanilide, naphthylamine, antipyrine.

By the present invention furfuramide, commercially known as vercazol is used. It has in high degree the valuable property of improving considerably the conditions of vulcanization and the qualities of the vulcanized rubber.

When added to the extent of 0.5–2 per cent of the weight of the rubber in the mixture to be vulcanized, it diminishes the duration of the vulcanizing operation by 70–80 per cent and the temperature of the heating by 8°–10° C., which proves its power as an accelerator. It increases the elasticity, the nervous quality and the resistance to breaking of the vulcanized rubber by 100–150 per cent, thereby showing its power as a vitalizer.

The following examples illustrate the invention:—

*Example 1.*—There is made a mixture of a plantation rubber, smoked crepe, 10 kilos; zinc oxide, 11 kilos; sulphur, 0.5 kilos.

The ordinary conditions of vulcanization in a pressure mould are as follows: steam pressure during the operation, 3 kilos; time during which the pressure rises to 3 kilos, 10 minutes; duration of the heating under 3 kilos pressure, during which vulcanization occurs, 1 hour; temperature of the heating, 143° C.

If the 0.5 kilo of sulphur used to vulcanize the foregoing mixture be very intimately incorporated with 100 grams of furfuramide, that is to say 1 per cent of the weight of the pure rubber, the conditions of vulcanization become, steam pressure during the operation, 2.2 kilos; time during which the pressure rises to 2.2 kilos, 8 minutes, duration of the heating under 2.2 kilos pressure during which vulcanization occurs, 10 minutes; temperature of the heating 135° C.

Thus the use of furfuramide permits—

1. Reduction of the duration of vulcanization by 85 per cent.

2. Reduction of the steam pressure by 0.8 kilos.

3. Reduction of the temperature of heating by 8° C.

*Example 2.*—A mixture is made of regenerated rubber, 2.8 kilos; accra rubber, 0.2 kilos; loading, 7.0 kilos.

Vulcanization under ordinary conditions gives a vulcanized product which has a breaking strain of 102 grams per sq. millimeter. By using 30 grams of furfuramide there is produced a vulcanized product the breaking strain of which is 220 grams per sq. millimeter, an increase of 115 per cent.

The whole operation constituting the vulcanization may be varied very widely, according on the one hand to the composition of the mixture, the temperatures and the duration of heating, and on the other hand to the nature of the product to be made, varying from very supple industrial rubber to ebonite.

The use of furfuramide in very small proportion in these operations always accelerates considerably the vulcanization and improves greatly the qualities of the vulcanized products as already stated.

It has been found that derivatives of furfuramide made (1) by condensing pyromucic aldehyde and its homologues with ammonia or amines, (2) by isomerization of these compounds, (3) by addition or substitution of other chemical groups to the foregoing derivatives—that is to say, all nitrogen derivatives of the group furfuryl act in like manner to furfuramide and have similar accelerating and vitalizing properties.

If in the two preceding examples there be substituted for the furfuramide, furfurine, furfuro-dianiline, furfurotoluidine, furfurodiphenylamine, oxyfurfuraniline, furfuromethylaniline, furfurophenylhydrazine, furfurylamine or the like, more or less important improvements in the conditions of ordinary vulcanization are observed and prove to be of the same nature and order as those produced by using furfuramide.

Having now fully described the nature of my said invention and the best means I know of carrying the same into practical effect, I claim:—

1. Process of vulcanizing which comprises adding to a vulcanizable mixture of rubber and other substances a small proportion of a compound containing in its composition the furyl radicle and nitrogen, that acts as accelerator and vitalizer.

2. Process of vulcanizing which comprises adding to a vulcanizable mixture containing rubber a small proportion of a compound containing in its composition the furfane aldehyde (furfurol) radicle and nitrogen, that acts as accelerator and vitalizer.

3. A process of vulcanizing which comprises, adding to a mixture of rubber and other substances a small proportion of condensation derivatives of furfurol and amines, and heating the mixture for vulcanization, whereby the vulcanization is accelerated.

4. A process of vulcanizing which comprises adding to a mixture of rubber and other substances a small proportion of derivatives made by condensing furfurol with ammonia and heating the mixture for vulcanization whereby the vulcanization is accelerated.

5. Process of vulcanizing which comprises adding to the mixture of rubber and other materials a small proportion of furfuramide and heating the mixture under the customary vulcanizing conditions whereby the vulcanization is accelerated.

6. Process of vulcanizing which comprises adding to a mixture of rubber and other substances a small proportion of derivatives made by isomerization of furfuramide and heating the mixture of vulcanization, whereby the vulcanization is accelerated.

7. Process of vulcanizing which comprises adding to a mixture of rubber and other substances a small proportion of furfurine and heating the mixture for vulcanization whereby the vulcanization is accelerated.

8. A process of vulcanizing which comprises adding to a mixture of rubber and other substances a small proportion of derivates made by nitrosation of isomeric derivatives of furfuramide and heating the mixture for vulcanization, whereby the vulcanization is accelerated.

9. A process of vulcanizing which comprises adding to a mixture of rubber and other substances a small proportion of nitroso-furfurine and heating the mixture for vulcanization, whereby the vulcanization accelerated.

In testimony that I claim the foregoing as my invention, I have signed my name.

ELOI RICARD.